US011321914B1

(12) United States Patent
Fotland et al.

(10) Patent No.: US 11,321,914 B1
(45) Date of Patent: May 3, 2022

(54) SYSTEM FOR GENERATING A NAVIGATIONAL MAP OF AN ENVIRONMENT

(71) Applicant: AMAZON TECHNOLOGIES, INC., Seattle, WA (US)

(72) Inventors: David Allen Fotland, San Jose, CA (US); Roger Robert Webster, Los Altos, CA (US); Arif Dikici, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 48 days.

(21) Appl. No.: 15/867,449

(22) Filed: Jan. 10, 2018

(51) Int. Cl.
*B25J 9/16* (2006.01)
*G06T 17/05* (2011.01)
*B25J 9/00* (2006.01)
*G06T 7/73* (2017.01)

(52) U.S. Cl.
CPC ............ *G06T 17/05* (2013.01); *B25J 9/0003* (2013.01); *B25J 9/1666* (2013.01); *B25J 9/1697* (2013.01); *G06T 7/74* (2017.01)

(58) Field of Classification Search
CPC . G06T 17/05; G06T 7/74; B25J 9/1666; B25J 9/1697; B25J 9/0003
USPC ........................................................ 700/258
See application file for complete search history.

(56) References Cited

U.S. PATENT DOCUMENTS

| | | | |
|---|---|---|---|
| 8,411,113 B1* | 4/2013 | Cornell | G06T 17/05 345/629 |
| 10,203,762 B2* | 2/2019 | Bradski | G02B 30/52 |
| 2004/0168148 A1* | 8/2004 | Goncalves | G05D 1/0248 717/104 |
| 2013/0226344 A1* | 8/2013 | Wong | G05D 1/024 700/258 |
| 2016/0148433 A1* | 5/2016 | Petrovskaya | G06T 19/006 345/633 |
| 2017/0206712 A1* | 7/2017 | Petrovskaya | G06F 3/017 |
| 2018/0202814 A1* | 7/2018 | Kudrynski | G06T 7/55 |
| 2019/0034864 A1* | 1/2019 | Skaff | G06K 7/1413 |

* cited by examiner

*Primary Examiner* — Masud Ahmed
(74) *Attorney, Agent, or Firm* — Lindauer Law, PLLC

(57) ABSTRACT

A point cloud or map of an environment is generated by determining sets of landmark points from multiple images, such as through use of a Simultaneous Localization and Mapping (SLAM) algorithm. Images acquired using a depth camera are used to determine depth points indicative of at least one object not represented by the landmark points. A combined map is generated to include both the landmark points and the depth points. The set of depth points is mapped to a corresponding set of landmark points based on proximity of the points, similarity of the camera poses, or times that the images were acquired. The relationship between the depth and landmark points may be determined. When the landmark points are moved, such as to account for error in the SLAM algorithm, the depth points may be moved to a modified location relative to the landmark points so that the relationship remains constant.

20 Claims, 5 Drawing Sheets

FIG. 1

SYSTEM FOR GENERATING A NAVIGATIONAL MAP OF AN ENVIRONMENT

BACKGROUND

A robotic device may navigate within an environment using one or more maps of the environment that indicate the presence of solid objects. For example, a robotic device may acquire images using a camera, determine visible features in the images, and determine its location within the environment based on correspondence between the visible features in the images and those in the map.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
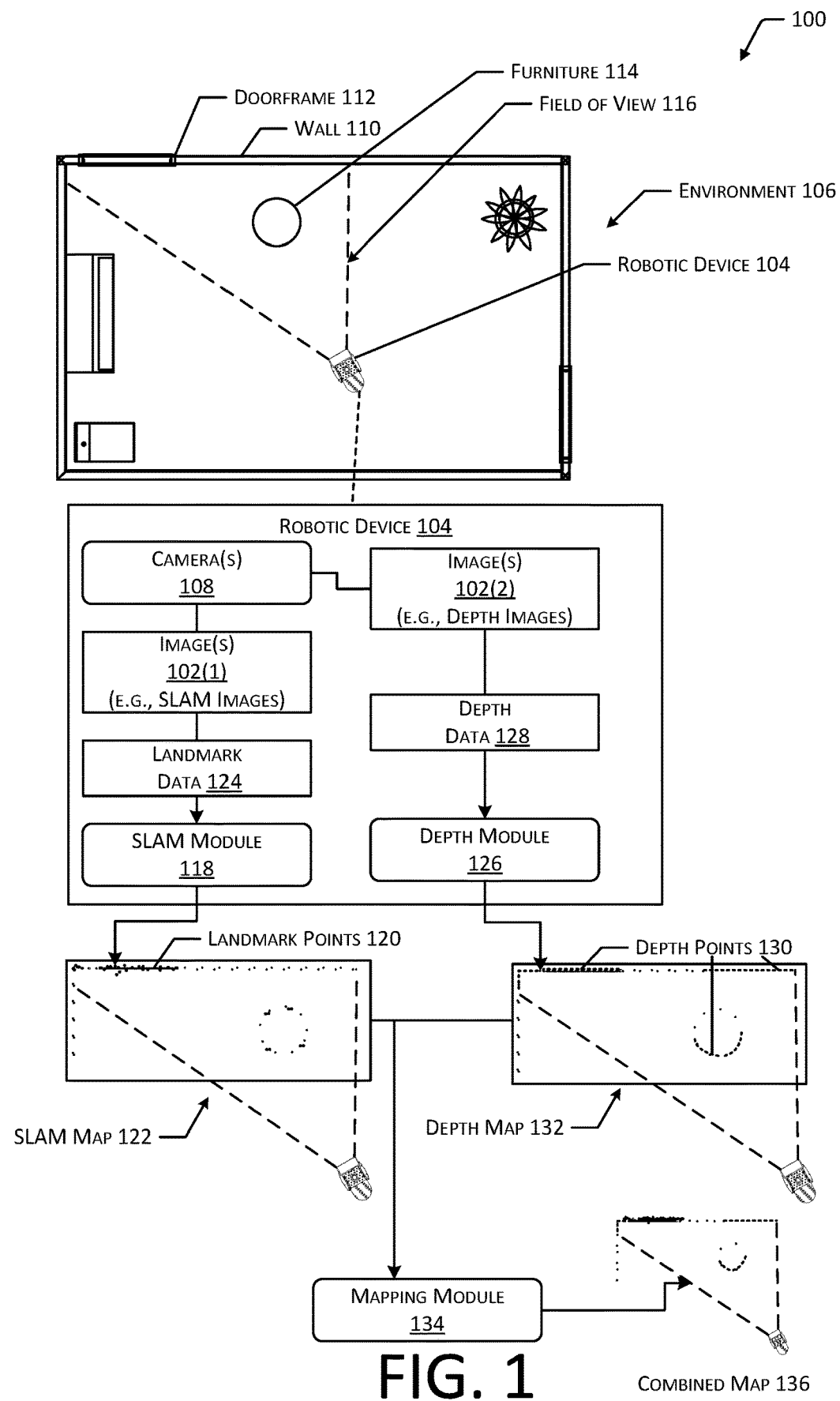
FIG. 1 depicts an implementation of a system for generating a point cloud or map based on images acquired by a robotic device in an environment.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A robotic device may navigate within an environment by acquiring one or more images using a camera, determining visible features within the images that represent solid objects, and determining routes that avoid collision with the objects. In some cases, a robotic device may navigate within an environment using a map that may be generated based on previously-acquired images. For example, a robotic device may acquire multiple images of an environment from different positions, determine visible features in the images that correspond to solid objects, and generate a point cloud or map, representative of coordinates in three-dimensional (3D) space that correspond to the objects or other visible landmarks. As used herein, a point may refer to a location in 3D space. For example, a point may be characterized by coordinates along three mutually orthogonal axes (e.g., a X, Y, and Z axis). Subsequently, the location of the robotic device within the environment may be determined using the map. For example, when the robotic device acquires one or more images that include at least a portion of a landmark represented in the map, the location of the landmark within the map and within the image(s) acquired by the robotic device may be used to determine the current location of the robotic device. Based on the current location of the robotic device and the locations of objects indicated in the map, routes within the environment that will not intersect objects, thus avoiding collisions, may be determined.

One process that may be used for the location and navigation of robotic devices is a Simultaneous Localization and Mapping (SLAM) process. A SLAM process includes acquiring images of an environment using one or more cameras associated with a robotic device. For each acquired image, a camera pose may be stored. The camera pose for an image may indicate both the physical position (e.g., a coordinate location along X, Y, and Z axes) and an angular orientation (e.g., pitch, roll, and yaw) of the camera. The SLAM images may be analyzed to determine the presence of visible landmarks, which may include furniture or other objects in an environment, and visible features of walls, such as windows, doors, doorframes, and regions of walls having visible texture. Based on the camera pose and the locations of visible features in an image, the images may be used to assemble a point cloud that includes coordinate points representative of the locations of these visible features. Each landmark point within the point cloud may include data corresponding to the location of the point in 3D space (e.g., X, Y, and Z coordinates). Additionally, the SLAM process may include recording information regarding the landmark represented by the point, such as an indication of color, texture, contrast, gradient, and so forth, which may be stored in association with the landmark point. In some cases, data indicative of the camera pose associated with the image may also be stored in association with the landmark points determined using that image. A SLAM map including the landmark points may be generated. Subsequently, if a robotic device acquires an image that includes a visible feature, correspondence between the visible feature of the image and the corresponding visible feature in the SLAM map may be determined based on the location and landmark information associated with one or more of the landmark points.

However, a SLAM process may not be capable of determining the presence of objects that lack visible features, such as featureless walls, or narrow objects, such as the legs of tables or chairs. As such, the landmark points determined using a SLAM process may be relatively sparse and limited primarily to locations that correspond to visible landmarks within the images. Additionally, consecutively acquiring additional images adding points to a SLAM map may introduce error in the locations of points. When a robotic device that has navigated an environment to generate a SLAM map reaches its point of origin, which may be determined by recognizing previously-identified landmarks in newly-acquired images, the differences between the positions of landmark points determined using the most recent images and those determined using the original images may be corrected. This portion of the SLAM process may be referred to as "closing the loop." Due to the relatively small number of landmark points determined using the SLAM process, the clustering of the points at the locations of visible landmarks, and the potential error in the locations of one or more points, the ability to determine the current location of a robotic device and to navigate the robotic device within close proximity of objects using a SLAM map may be limited. For example, a SLAM map may enable a robotic device to be navigated to within a distance of approximately twenty centimeters from an object, however, attempting to navigate the robotic device within a closer distance may increase risk of a collision due to the potential error in the location of the landmark points. Additionally, because the landmark points determined using a SLAM process are primarily limited to visible features determined from images and may not include less visible features, such as featureless walls, determination of routes that avoid collisions with features not detected using the SLAM process may not be possible.

Described in this disclosure are techniques for improving the accuracy and completeness of a SLAM map by determining the locations of objects not determined via the SLAM process, such as by using a depth camera, and adding depth points corresponding to these objects to the SLAM map. For example, concurrent with performance of a SLAM process to determine landmark points indicative of visible landmarks, a range camera or depth camera may use projected or patterned light, Light Detection and Ranging (LIDAR), or similar technology to determine the distance between the camera and one or more other objects not detected using the SLAM process. Because the presence of these other objects is determined using light or other types of signals emitted by a camera, rather than by visible features of the objects themselves, points that correspond to the locations of these objects may be added to a SLAM map, but landmark information regarding the color, gradient, or other features of the object detected by the camera may not be obtained. As such, the depth points may not be used to determine the location of the robotic device relative to the objects based on subsequent images acquired by the robotic device, but may indicate the location of the objects to enable routes that do not collide with the objects to be generated.

When landmark points determined using the SLAM process are moved, such as when "closing the loop" to account for sources of error in the locations of points, the original positions of the depth points determined using the depth camera may no longer accurately correspond to the locations of objects in the SLAM map. Therefore, this disclosure also relates to techniques for associating sets of depth points determined using a depth camera with particular sets of landmark points determined using a SLAM process, such that when a set of landmark points is moved, the corresponding set of depth points may be moved in a manner that maintains the same positional and angular relationship between the depth points and the landmark points.

For example, a robotic device may include one or more cameras. In one implementation, the robotic device may include a stereo camera for acquiring images for use as inputs to a SLAM algorithm and a depth or range camera for detecting objects other than the visible landmarks determined using the SLAM process. A first image or set of images may be acquired using the first camera. Image characteristics, such as a first camera pose indicative of a location (e.g., X, Y, and Z coordinates along mutually orthogonal axes) and an angular orientation (e.g., pitch, roll, and yaw values) of the camera at the time the image or set of images is acquired may also be determined. The image(s) may contain digital representations of physical objects and may be used as an input to a SLAM algorithm to determine a first set of landmark points, each of which corresponds to a physical location of an object represented in the image(s). A second set of images may also be acquired using the first camera, a second camera pose for the image(s) may be determined, and the image(s) may be used as an input to a SLAM algorithm to determine a second set of landmark points. Similarly, any number of additional images or sets of images may be acquired and analyzed to determine sets of landmark points.

The landmark points determined using the SLAM process may generally be clustered near the locations of visible landmarks determined from the images and may not indicate the presence of narrow or featureless objects, such as smooth or blank walls. Therefore, a third image or set of images may be acquired using the second camera, which may include a depth camera, a range camera, or a similar device capable of determining a distance between the camera and an object. For example, the second camera may emit a signal, such as projected light, in a direction associated with the field of view of the camera, and the acquired image may be based in part on a time associated with the reflection of the signal. The third image(s) may be analyzed to determine a set of depth points, each of which may indicate a coordinate location that corresponds to a physical location of an object within the field of view of the camera. A camera pose indicative of the location and angular orientation of the second camera may also be stored. In some implementations, the count of depth points determined using the depth camera may be greater than the counts of landmark points determined using the SLAM algorithm. Additionally, the depth points may correspond to one or more objects other than the visible landmarks represented by the landmark points.

A map that includes the landmark points determined from each SLAM image and the depth points determined by the depth camera may be generated. However, when one or more of the landmark points are moved, such as when correcting errors in location when "closing the loop" during the SLAM process, the original locations of the depth points may not correspond to the physical locations of objects in the physical environment, relative to the landmark points. To prevent this error, a set of depth points may be moved concurrently when a corresponding set of landmark points is moved. For example, a set of depth points may be mapped to a particular set of landmark points based on similarities between the depth points and landmark points. In some implementations, a distance between a particular point associated with a set of depth points and respective particular points associated with sets of landmark points determined from one or more SLAM images may be determined. The set of depth points may be mapped to the set of landmark points that is physically closest to the depth points. In other implementations, the camera poses associated with the image from which the landmark points were determined and the camera poses associated with the image from which the depth points were determined may be compared. The set of depth points may be mapped to the set of landmark points having the most similar camera pose to the camera pose associated with the depth points. For example, a camera pose may be represented by six degrees of freedom indicative of a camera position (e.g., X, Y, and Z coordinates) and an angular orientation (e.g., pitch, roll, and yaw). A difference between two camera poses may be determined based on a difference between each of the X, Y, Z, pitch, roll, and yaw values for each camera pose. The set of depth points may be mapped to the set of landmark points having a camera pose that differs the least with regard to the camera pose associated with the depth points. In still other implementations, other image characteristics, such as the times at which the images associated with the landmark points were acquired, may be compared to the time at which the image associated with the depth points was acquired. The set of depth points may be mapped to the set of landmark points that was acquired the closest in time to the set of depth points. In one implementation, a depth camera may be configured to acquire images concurrently (e.g., within a threshold time) with the acquisition of images using a SLAM camera, and the set of points determined from the depth image may be mapped to the set of points determined from the corresponding SLAM image acquired at approximately the same time. Combinations of these elements may also be used to determine correspondence between the depth points and at least one set of landmark points. For example, a set of depth points may be mapped to a set of landmark points based on both the proximity of the depth points to the landmark points and the similarity between the camera poses for each image.

After determining a set of landmark points that corresponds to the set of depth points, a relationship between the camera poses for the cameras used to acquire the set(s) of landmark points may be compared with the camera pose for the depth camera. For example, the camera pose for the depth camera image may be offset by a particular distance and angular orientation relative to the camera pose for the corresponding SLAM image. The relationship between the two camera poses may be represented by a vector between the two camera poses. Subsequently, when the set of landmark points is moved, such as when accounting for error due to the SLAM process, the set of depth points may also be moved such that the vector between the camera poses remains constant. The resulting map that includes both the moved set of landmark points and the moved set of depth points may therefore more accurately and more completely depict the locations of objects than a SLAM map that does not include depth points.

FIG. 1 depicts an implementation of a system 100 for generating a point cloud or map based on images 102 acquired by a robotic device 104 in an environment 106. The robotic device 104 may include any manner of moveable device having one or more cameras 108 capable of acquiring images 102 of the environment 106. Example implementations of robotic devices 104 that may be used are described in U.S. patent application Ser. No. 15/613,916, filed Jun. 5, 2017, entitled "Robotic Assistant" and in U.S. patent application Ser. No. 15/681,097, filed Aug. 18, 2017, entitled "Robot Movement Constraint System". Application Ser. Nos. 15/613,916 and 15/681,097 are incorporated by reference herein in their entirety. In one implementation, the robotic device 104 may include a first camera 108 or set of cameras 108 configured to acquire images of the environment 106 that may be used as inputs for a SLAM algorithm, and a second camera 108 or set of cameras 108 that include one or more depth cameras 108 or range cameras 108 configured to determine the distance between the robotic device 104 and one or more objects in the environment 106.

The environment 106 may include any area able to contain the robotic device 104 that includes one or more objects detectable by the robotic device 104. For example, FIG. 1 depicts the environment 106 as a rectangular room within a dwelling, defined by four linear walls 110. In other implementations, the environment 106 may have other shapes, the walls 110 or other types of barriers or boundaries of the environment 106 may be curved, angled, or have irregular non-linear shapes. In still other implementations, or one or more portions of the environment 106 may lack a wall 110 or other type of barrier. FIG. 1 depicts two of the walls 110 including doorframes 112 formed therein. For example, the walls 110 may be generally smooth, while the doorframes 112 may function as visible interruptions in the walls 110 that may be detectable within one or more images 102. Continuing the example, one or more images 102 depicting a wall 110 may be used as inputs for a SLAM algorithm, but use of the SLAM algorithm may not determine the presence of featureless portions of the wall 110. However, the SLAM algorithm may determine the presence of the doorframes 112 or other visible features, which may be used to locate and navigate the robotic device 104 within the environment 106. FIG. 1 further depicts the environment 106 including one or more other types of objects, such as furniture 114. In some implementations, furniture 114 may include heavy objects that are generally expected to remain in a fixed position for an extended period of time, such as a bookshelf or bed, or lighter objects that may be more readily moved, such as a chair. As such, objects within an environment 106 may include permanent fixtures, such as walls 110, objects that are generally expected to remain in a fixed position, such as heavy furniture 114, and moveable objects, such as light or portable furniture 114.

One or more of the cameras 108 may be used to acquire one or more images 102(1) of a portion of the environment 106 within the field of view 116 of the camera(s) 108. The images 102 may therefore contain digital representations of one or more visible landmarks in the environment 106. For example, a first image 102(1) or set of images 102(1) may be used as inputs to a SLAM module 118, which may analyze the images 102(1) to determine the presence of visible landmarks, such as doorframes 112 or other features of the wall 110, furniture 114, and so forth, within the environment 106. Continuing the example, based on the camera pose (e.g., the position and angular orientation) of the camera(s) 108 and the location of the digital representation(s) of the landmark(s) within the image(s) 102(1), the SLAM module 118 may determine the locations of landmarks in the environment 106 that correspond to the digital representations. The SLAM module 118 may generate landmark points 120 within a SLAM map 122 representative of the environment 106, the landmark points 120 representing the locations of the landmarks within the environment 106 determined from the visible features within the image(s) 102(1). For example, based on the camera pose of the camera(s) 108 used to acquire the image(s) 102(1), the SLAM module 118 may determine a coordinate location of the landmark points 120 within the SLAM map 122. As used herein, the term map may indicate a graphical map, an alphanumeric list or other data structure indicative of points such as point cloud, or combinations thereof. The SLAM module 118 may also determine landmark data 124 that may indicate information regarding the landmarks represented by the landmark points 120, such as a color, texture, gradient, dimensions, or other features of the landmarks. As such, each landmark point 120 may include data indicative of a location (e.g., a coordinate location) of the landmark point 120, landmark data 124 indicative of one or more characteristics of the landmark represented by the landmark point 120, and in some implementations, data indicative of the camera pose of the camera(s) 108 used to acquire the image(s) 102(1).

In some implementations, a robotic device 104 may be configured to acquire a large number of images 102(1), such as ten images per second or more. In such cases, use of every image acquired by the camera(s) 108 to generate the SLAM map 122 may consume an impractical amount of computational resources. The SLAM module 118 may be configured to determine particular images 102(1) that may be used as keyframes for generation of the SLAM map 122, while other images 102(1) may be disregarded. A keyframe may refer to an image 102(1) associated with a set of landmark points 120 that differs from the landmark points 120 of each other keyframe by at least a threshold amount, such as thirty percent. For example, the robotic device 104 may acquire a first image 102(1) that is used as a keyframe. However, the subsequent image 102(1) acquired by the robotic device 104 may be acquired at a time when the robotic device 104 has not yet moved a significant distance, and the landmark points 120 determined using the subsequent image 102(1) may not differ significantly from those determined using the first image 102(1). Therefore, the subsequent image 102(1) may be discarded or otherwise withheld from use generating the SLAM map 122. However, when a subsequent image 102(1) is acquired having at least a threshold portion of landmark points 120 that differ from the landmark points 120 of the previous keyframe, the subsequent image 102(1) may be used as a keyframe for generation of the SLAM map 122. This process for selecting additional keyframes for use generating the SLAM map 122 may continue until the SLAM process is complete. Each keyframe may represent a single image 102(1) or set of images 102(1), the camera pose used to acquire the image(s) 102(1), and a corresponding set of landmark points 120 determined from the image(s) 102(1).

As described previously, a SLAM process may not successfully determine the presence of primarily featureless objects, such as smooth or blank walls 110, included in the images 102(1). Therefore, the landmark points 120 may be generally sparse in number and clustered primarily at locations of visible features that correspond to visible landmarks, such as doorframes 112, furniture 114, corners and edges where walls 110 intersect, and so forth. To supplement the landmark points 120 determined using the SLAM module 118, one or more range or depth cameras 108 may be used to acquire one or more additional images 102(2) of a portion of the environment 106 associated with the field of view 116 of the range or depth cameras 108. In other implementations, the same images 102(1) used by the SLAM module 118 may be used in place of or in addition to images 102(2) acquired by depth cameras 108. In some implementations, the range or depth cameras 108 may acquire images 102(2) concurrently or within a threshold time of the acquisition of the image(s) 102(1) used by the SLAM module 118. In other implementations, the range or depth cameras 108 may acquire images 102(2) independent of the times at which the images 102(1) used by the SLAM module 118 are acquired. A depth or range camera 108 may project light or another type of signal in a direction of one or more objects within the environment 106 and may generate the image(s) 102(2) based at least in part on the time associated with reflection of the signal. A depth module 126 may process the images 102(2) to determine depth data 128 indicative of a distance between the camera 108 and one or more objects. The depth module 126 may determine one or more depth points 130 based on the depth data 128 and generate a depth map 132 including the depth points 130. Each depth point 130 may have a coordinate location within the depth map 132 that represents a location of an object within the environment 106 that is determined using the image(s) 102(2). Because a depth camera 108 may detect a reflected signal rather than visible objects themselves, no landmark data 124 associated with the depth points 130 may be generated. Therefore, the depth points 130 may be associated with a location within a depth map 132, but may not necessarily be used to subsequently determine the location of the robotic device 104 relative to the objects represented by the depth points 130. In some implementations, the depth map 132 may include a two-dimensional representation of the environment 106. For example, the depth module 126 may determine the presence of an object at a given two-dimensional location (e.g., a coordinate location along X and Y axes) at any vertical height (e.g., a location along a Z axis) less than a threshold height, such as the height of the robotic device 104. If any object is present within the threshold height at a given two-dimensional location, a depth point 130 may be included in the depth map 132 at a corresponding coordinate location independent of the vertical height at which the object was located.

In some implementations, the count of depth points 130 determined by the depth module 126 for a particular image 102(2) or set of images 102(2) may exceed the count of landmark points 120 associated with a SLAM image 102(1) or set of images 102(1). Additionally, in some images 102(2), the depth points 130 may correspond to at least one object in the environment 106 not detected using the SLAM algorithm. As discussed previously with regard to the SLAM module 118, in some implementations the depth module 126 may use only a portion of the images 102(2) as keyframes for determination of depth points 130 and generation of a depth map 132. For example, only the images 102(2) associated with a set of depth points 130 that differ by at least a threshold amount from each other keyframe may be used to generate the depth map 132.

A mapping module 134 may generate a combined map 136 that includes the landmark points 120 from the SLAM map 122 and the depth points 130 from the depth map 132. Additionally, the mapping module 134 may map a particular set of depth points 130, such as the depth points 130 that correspond to a depth keyframe, to a particular set of landmark points 120, such as the landmark points 120 that correspond to a SLAM keyframe. The mapping of a depth keyframe to a SLAM keyframe may be determined based on the proximity of the depth points 130 to the landmark points 120, the similarity of the camera poses for the depth and SLAM keyframes, the similarity of the times at which the depth and SLAM keyframes were acquired, or a combination of these factors. After associating a set of depth points 130 with a set of landmark points 120, if the landmark points 120 are moved, such as when accounting for error as part of a SLAM process, the depth points 130 may be moved such that the relationship between the depth points 130 and the landmark points 120 remains constant.

While FIG. 1 depicts the SLAM module 118, depth module 126, and mapping module 134 associated with the robotic device 104, in other implementations, one or more functions described with regard to these modules may be performed by one or more other computing devices. For example, one or more servers in communication with the robotic device 104 may perform a SLAM process, analyze images to determine depth points 130, generate a combined map 136, and so forth, and may provide data associated with these processes to the robotic device 104 for use or further processing.

Figure 2:
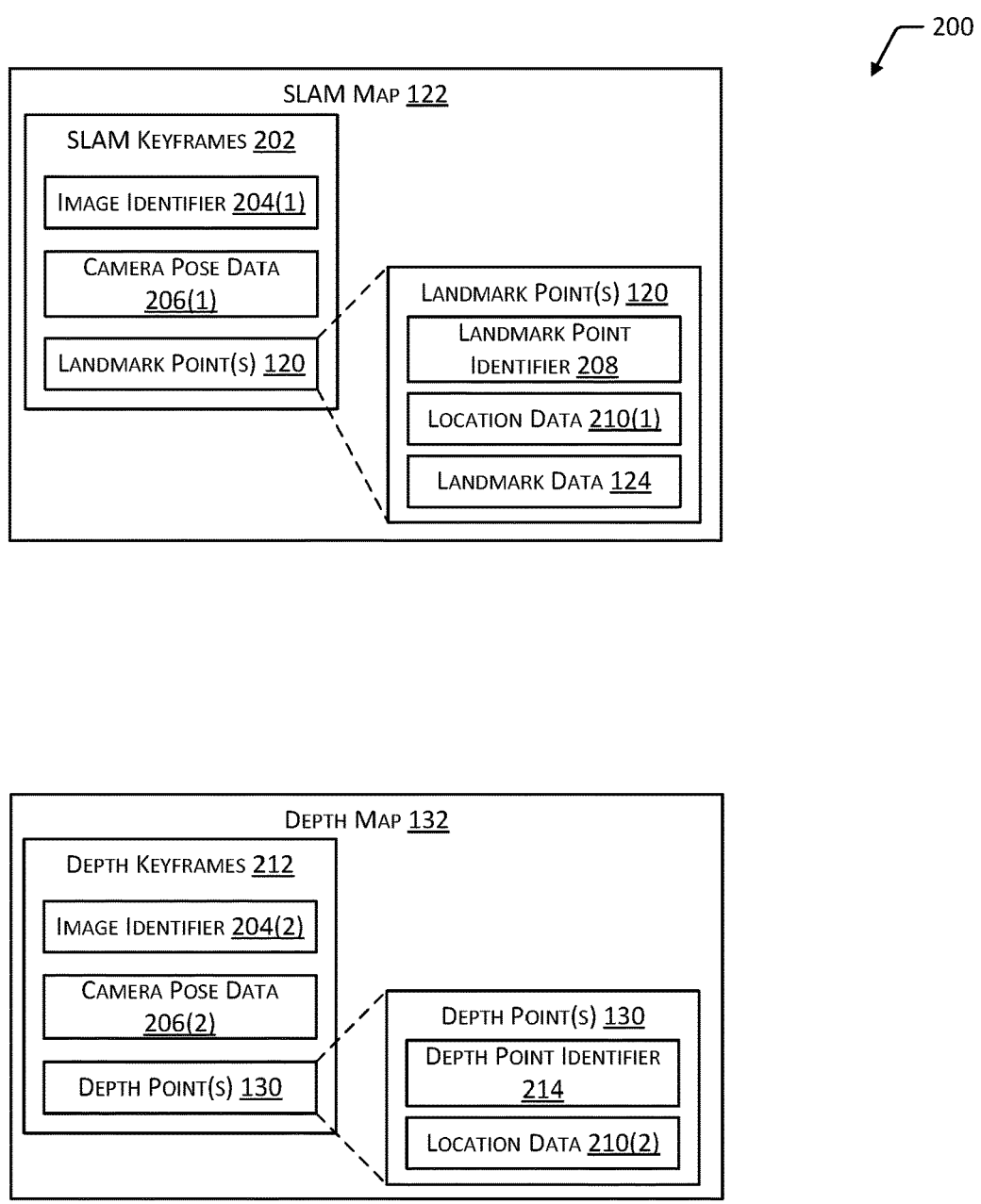
FIG. 2 is a block diagram depicting example implementations of data associated with SLAM maps and depth maps.

FIG. 2 is a block diagram 200 depicting example implementations of data associated with SLAM maps 122 and depth maps 132. As described with regard to FIG. 1, a SLAM map 122 may include a plurality of landmark points 120 determined from multiple images 102(1). In some implementations, the SLAM map 122 may include a graphical or visual map. In other implementations, the SLAM map 122, may include a list, table, or other data structure indicative of coordinate locations of the landmark point(s) 120. While a camera 108 may acquire a large number of images 102(1) of an environment 106, as discussed previously, only a portion of the images 102(1) may be used as SLAM keyframes 202 for generation of the SLAM map 122. For example, a particular image 102(1) may be used as a SLAM keyframe 202 if the landmark points 120 determined from the image 102(1) differ from those determined using each other SLAM keyframe 202 by at least a threshold amount, such as thirty percent of the landmark points 120. Other landmark points 120 included in a SLAM keyframe 202 may be included in multiple SLAM keyframes 202. For example, two images 102(1) may visualize the same landmark from different locations and angles (e.g., different camera poses), which may result in the same landmark point 120 being included in multiple SLAM keyframes 202.

In some implementations, a SLAM keyframe 202 may include an image identifier 204(1), which may include any manner of alphanumeric data, audio data, image data, or other types of data or metadata that may be used to differentiate a particular SLAM keyframe 202 from other SLAM keyframes 202. A SLAM keyframe 202 may also include camera pose data 206(1) indicative of a position and angular orientation of a camera 108 used to acquire the SLAM keyframe 202. For example, camera pose data 206(1) may indicate six degrees of freedom indicative of a camera position (e.g., X, Y, and Z coordinates in 3D space) and an angular orientation (e.g., pitch, roll, and yaw).

A SLAM keyframe 202 may also include one or more landmark points 120 that may be determined based on visible features of the keyframe image 102(1). In some implementations, each landmark point 120 may be represented by a landmark point identifier 208. Landmark point identifiers 208 may include one or more of alphanumeric data, audio data, image data, or another type of data or metadata that may be used to differentiate a particular landmark point 120 from other landmark points 120. Landmark points 120 may also include location data 210 indicative of a location of the landmark point 120 within the SLAM map 122. For example, the location data 210 may include a coordinate location of the landmark point 120, such as coordinates along three mutually orthogonal axes (e.g., X, Y, and Z axes). A landmark point 120 may also include landmark data 124, which may include information descriptive of one or more characteristics of the landmark represented by the landmark point 120. For example, landmark data 124 may include an indication of one or more of a color, texture, contrast, gradient, dimension, and so forth associated with a visible feature of the SLAM keyframe 202. The landmark data 124 may be used to differentiate a particular landmark from other landmarks. For example, if a successive image 102(1) includes a landmark point 120 that corresponds to the same landmark as the landmark point 120 of the SLAM keyframe 202, the landmark point 120 in the successive image 102(1) may be associated with the same landmark data 124.

As described with regard to FIG. 1, a depth map 132 includes a plurality of depth points 130 determined by acquiring images 102(2) using a depth camera, range camera, or other types of cameras 108. In one implementation, two images 102(2) may be acquired using stereo cameras, and the disparity between the two images 102(2) and the known difference in the poses of the cameras 108 may be used to calculate the distance to objects within the images 102(2). In some implementations, the depth map 132 may include a graphical or visual map. In other implementations, the depth map 132 may include a list, table, or other data structure indicative of the locations of the depth points 130. While one or more depth cameras 108 may be used to acquire a large number of images 102(2) of an environment 106, such as ten images 102(2) per second, as discussed previously, only a portion of the images 102(2) may be used as depth keyframes 212 for generation of the depth map 132. A particular image 102(2) may be used as a depth keyframe 212 if the depth points 130 determined from the image 102(2) differ from those determined using each other depth keyframe 212 by at least a threshold amount. Other depth points 130 included in a depth keyframe 212 may be included in multiple depth keyframes 212.

In some implementations, a depth keyframe 212 may include an image identifier 204(2), which may include one or more of alphanumeric data, audio data, image data, or another type of data or metadata that may be used to differentiate a particular depth keyframe 212 from other depth keyframes 212. A depth keyframe 212 may also include camera pose data 206(2) indicative of a position and angular orientation of the camera(s) 108 used to acquire the depth keyframe 212.

A depth keyframe 212 may also include a plurality of depth points 130, each of which may indicate the presence of an object within the field of view 116 of the depth camera 108. For example, a depth camera 108 may be configured to acquire images 102(2) having a selected count of pixels, such as a 640×480 image 102(2). Continuing the example, an image 102(2) may be divided into columns based on the width of the image 102(2), such as 480 columns, each having a width of one pixel. If the presence of an object within a column is determined at a height ranging from the floor to a threshold height, such as a value based on the height of the robotic device 104, the presence of an object within the column may be indicated, at a distance determined based on the depth data 128. In some implementations, a depth point 130 may be associated with a depth point identifier 214, which may include one or more of alphanumeric data, audio data, image data, or another type of data or metadata that may be used to differentiate a particular depth point 130 from other depth points 130. A depth point 130 may also be associated with location data 210(2), which may indicate the location of an object detected by the depth camera 108. For example, the location data 210(2) may include a coordinate location of an object. As described with regard to FIG. 1, the location data 210(2) may be determined in part based on depth data 128. For example, a depth camera 108 may emit a signal in the direction of the field of view 116, and the time associated with receipt of the reflected signal may be used to determine the distance between the camera 108 and the object. In some implementations, the location data 210(2) may include a two-dimensional coordinate location (e.g., a location along X and Y axes), and the depth point 130 may indicate the presence of an object at any vertical height less than or equal to the height of the robotic device 104.

Figure 3:
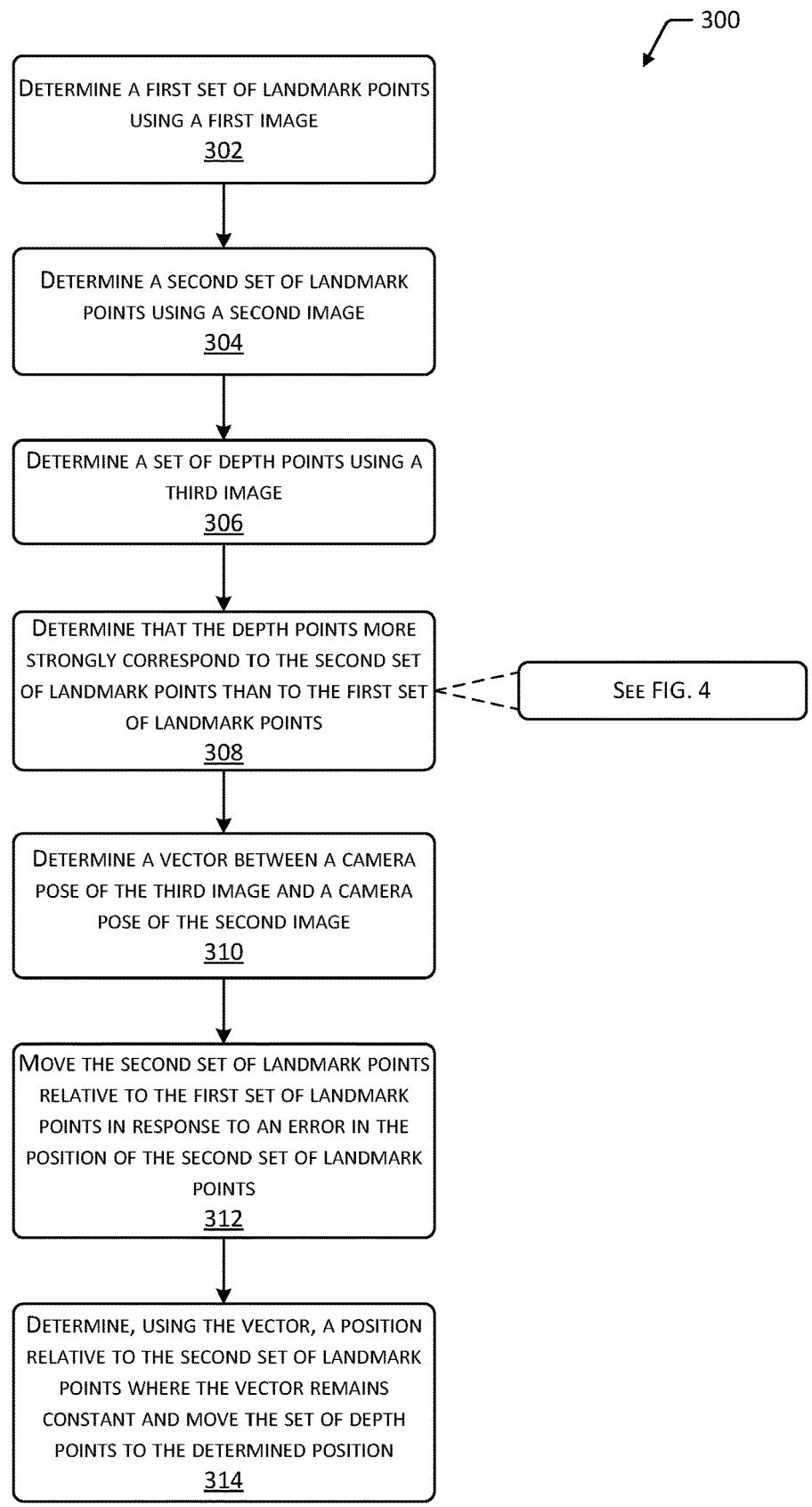
FIG. 3 is a flow diagram illustrating a method for mapping a set of depth points to a set of landmark points and moving the depth points responsive to movement of the landmark points.

FIG. 3 is a flow diagram 300 illustrating a method for mapping a set of depth points 130 to a set of landmark points 120 and moving the depth points 130 responsive to movement of the landmark points 120. At 302, a first set of landmark points 120 may be determined using a first image 102(1). For example, the first image 102(1) may be used as an input to a SLAM algorithm that may determine the presence of visible features (e.g., digital representations of landmarks) within the image 102(1). Based on the camera pose associated with the camera 108 used to acquire the image 102(1), which may indicate a position and angular orientation of the camera 108, a location of the visible landmarks that correspond to the digital representations within the image 102(1) may be determined. A landmark point 120 for at least a subset of the determined visible features may be stored, each landmark point 120 including location data 210(1) indicative of a location of the landmark point 120 within a SLAM map 122 that corresponds to a location of a landmark in the environment 106, and landmark data 124 indicative of one or more characteristics of the visible feature with which the landmark point 120 is associated.

At 304, a second set of landmark points 120 may be determined using a second image 102(1). For example, a robotic device 104 may be configured to acquire multiple images 102 with a camera 108, such as ten images per second, as the robotic device 104 navigates within an environment 106. As discussed previously, only a portion of the images 102(1) may be used as SLAM keyframes 202, based on the portion of landmark points 120 within the images 102(1) that differ from the landmark points 120 associated with each SLAM keyframe 202. Thus, the second image 102(1) at 304 may be used to determine a set of landmark points 120 that differs from the landmark points 120 associated with the first image 102(1) by at least a threshold portion, such as thirty percent.

At 306, a set of depth points 130 may be determined using a third image 102(2). For example, a depth camera, range camera, stereo camera, or other type of camera 108 that may be used to determine the distance between the camera 108 and one or more objects may be used to acquire the third image 102(2). Continuing the example, the camera 108 may emit projected light or another type of signal, which may be reflected by one or more objects and detected by the camera 108 or another type of detector. The time associated with detection of the reflected signal may indicate the distance between the camera 108 and the object(s). The resulting third image 102(2) may therefore be used to determine distances to various objects within the field of view 116 of the depth camera 108. Based on the third image 102(2) and the camera pose of the camera 108, locations of objects that correspond to features within the image 102(2) may be determined. Each depth point 130 may include location data 210(2) indicative of the location within a depth map 132 that corresponds to the location of the corresponding object in the environment 106.

At 308, a determination may be made that the depth points 130 more strongly correspond to the second set of landmark points 120 than to the first set of landmark points 120. Correspondence may be determined based on the location of the depth points 130 relative to the landmark points 120, the camera poses associated with the depth points 130 and landmark points 120, the times at which the third image 102(2), second image 102(1), and first image 102(1) were acquired, and so forth, as discussed subsequently with regard to FIG. 4.

At 310, a vector between a camera pose of the third image 102(2) and a camera pose of the second image 102(1) may be determined. For example, due to the correspondence between the depth points 130 associated with the third image 102(2) and the landmark points 120 associated with the second image 102(1), the depth points 130 may be associated with the landmark points 120 such that movement of the landmark points 120 within the combined map 136 results in movement of the associated depth points 130. In some implementations, the relationship between the depth points 130 and the landmark points 120 may be represented as a vector between the camera pose associated with the depth points 130 and the camera pose associated with the landmark points 120. For example, a positional difference between the location of the depth camera pose and that of the SLAM camera pose and an angular difference between the angular orientation of the depth camera pose and that of the SLAM camera pose may be expressed as a six-degree vector indicating the positional and angular offsets between the depth and SLAM camera poses. Continuing the example, the SLAM camera pose may indicate that a SLAM image was acquired while the SLAM camera was at a first location (e.g., X, Y, and Z coordinates) and a first angular orientation (e.g., pitch, roll, and yaw values). The depth camera pose may indicate that a depth image was acquired while the depth camera was in a second location (e.g., different X, Y, and Z coordinates) and a second angular orientation (e.g., different pitch, roll, and yaw values). The positional difference may be determined by subtracting X, Y, and Z coordinate values for the first location from those for the second location, while the angular difference may be determined by subtracting the pitch, roll, and yaw values for the first angular orientation from those for the second angular orientation. Thus, in some implementations, the positional difference may be expressed as a set of coordinate values indicating a difference between the locations associated with two camera poses (e.g., the differences in the X, Y, and Z values between the camera poses), while the angular difference may be expressed as a set of pitch, roll, and yaw values indicative of the difference between the two camera poses. In other implementations, the positional difference may be expressed as a distance, such as a linear distance determined based on the differences in the X, Y, and Z coordinate values.

In other implementations, a vector or other type of relationship may be determined between the camera pose of the third image 102(2) and the camera pose of multiple other images 102(1), such as the first image 102(1) and the second image 102(1). For example, a robotic device 104 may be configured to acquire the first image 102(1) for use as an input to a SLAM algorithm, then acquire the third image 102(2) for use determining depth points 130, then acquire the second image 102(1) for use as an input to the SLAM algorithm. Continuing the example, the third image 102(2) may be acquired at a time that is equally distant from the times at which the first and second images 102(1) are acquired. In such a case, the camera pose of the third image 102(2) may be mapped to an average value indicative of the camera poses of both the first and second images 102(1). For example, the camera pose of the third image 102(2) may be mapped to a location halfway between the two pose locations associated with the first and second images 102(1) and an angular orientation halfway between the angular orientations of the first and second images 102(1). In still other implementations, any number of SLAM keyframes 202 may be interpolated to determine an average camera pose, and a vector between the camera pose of a depth keyframe 212 and the average camera pose may be determined. For example, a depth keyframe 212 may be mapped to multiple SLAM keyframes 202 based on a relationship between the point locations, camera poses, or acquisition times of the keyframes.

At 312, the second set of landmark points 120 may be moved relative to the first set of landmark points 120 in response to an error in the position of the second set of landmark points 120. For example, when a robotic device 104 completes movement through an environment 106 and reaches its original position (e.g., "closing the loop" during a SLAM process), subsequent images 102 acquired by the robotic device 104 may include landmark points 120 identified in previous images 102. The offset in the locations of the landmark points 120 in the subsequent images 102 relative to the locations of the landmark points 120 in the previous images 102 may represent an error in the SLAM process. This error may be corrected by moving one or more of the sets of landmark points 120 within the combined map 136.

At 314, the vector determined at 310 may be used to determine a position, relative to the second set of landmark points 120, where the vector remains constant. The set of depth points 130 may be moved to the determined position. For example, based on the vector between the camera poses associated with the depth points 130 and landmark points 120, the direction and amount by which the position of the depth points 130 are translated and rotated to account for movement of the landmark points 120 may be determined. Based on the modified position of the landmark points 120, the depth points 130 may be moved to a new position such that the vector between the camera pose for the modified position of the landmark points 120 and the camera pose for the modified position of the depth points 130 remains constant. As a result, when the landmark points 120 are moved, movement of the depth points 130 may cause the depth points 130 to continue to accurately represent the locations of objects in the combined map 136.

Figure 4:
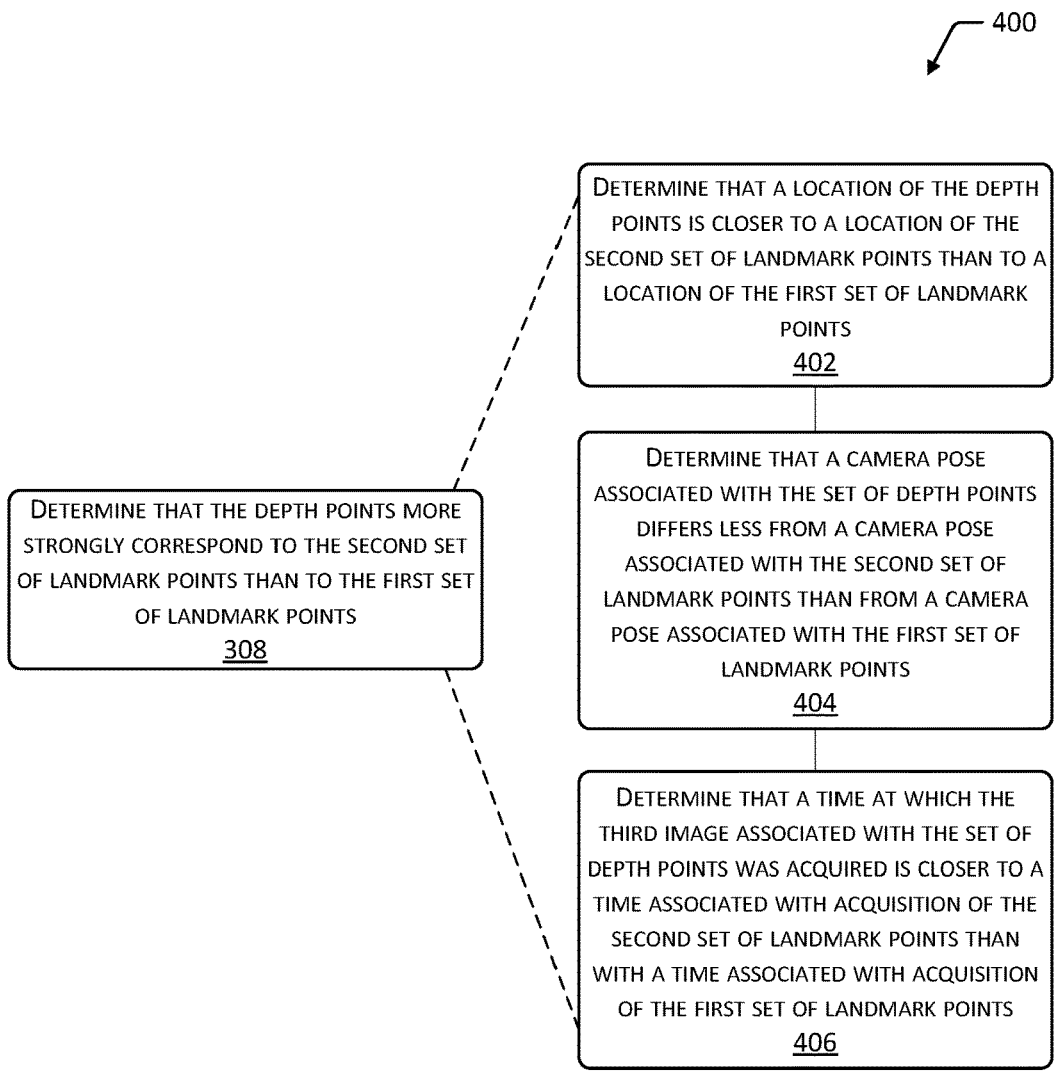
FIG. 4 is a block diagram illustrating example methods for determining correspondence between a set of depth points and a set of landmark points.

FIG. 4 is a block diagram 400 illustrating example methods for determining correspondence between a set of depth points 130 and a set of landmark points 120. As described with regard to FIG. 3, in response to a determination that the depth points 130 more strongly correspond to the second set of landmark points 120, a relationship between the depth points 130 and landmark points 120, such as a vector between the camera poses for each set of points, may be determined. FIG. 4 illustrates multiple methods by which correspondence between a set of depth points 130 and a set of landmark points 120 may be determined. Any one or a combination of methods may be used to determine correspondence between the depth points 130 and a particular set of landmark points 120. For example, a combination of methods may be used to determine a score or other type of metric value indicative of the correspondence between the depth points 130 and landmark points 120. Continuing the example, different methods illustrated in FIG. 4 may be weighted identically or differently, and a qualitative or quantitative value may be determined based on the results of each method.

At 402, one method for determining the correspondence may include determining that a location of the depth points 130 is closer to a location of the second set of landmark points 120 than to a location of the first set of landmark points 120. For example, the depth points 130 may be associated with location data 210(2) indicative of a location of the depth points 130 in 3D space. Continuing the example, the location data 210(2) may indicate a coordinate location along mutually orthogonal axes. Similarly, each set of landmark points 120 may be associated with location data 210(1) indicative of a coordinate location or other type of location. Based on the location data 210, a distance between the depth points 130 and each set of landmark points 120 may be determined. The distance may include a total, average, or median distance between at least a subset of the depth points 130 and at least a subset of the landmark points 120. In other cases, the distance may be measured between a central point or other selected point for the depth points 130 and a central point or other selected point for the landmark points 120. If the distance between the depth points 130 and a particular set of landmark points 120 is less than the distance between the depth points 130 and other sets of landmark points 120, correspondence between the depth points 130 and the particular set of landmark points 120 may be determined.

At 404, another method for determining the correspondence may include determining that a camera pose associated with the set of depth points 130 differs less from a camera pose associated with the second set of landmark points 120 than from a camera pose associated with the first set of landmark points 120. For example, each camera pose may be expressed as a six-degree position, such as through use of X, Y, and Z coordinates to indicate a position and pitch, roll, and yaw values to indicate an angular orientation. A difference between the camera pose for the depth points 130 and the camera poses for each set of landmark points 120 may be determined. For example, a difference may be expressed as positional and angular offsets between the camera pose of the depth points 130 and a camera pose associated with a set of landmark points 120. The set of landmark points 120 that corresponds to the smallest difference between the camera pose for the landmark points 120 and the camera pose for the depth points 130 may be determined to more strongly correspond to the depth points 130 than other sets of landmark points 120.

At 406, another method for determining the correspondence may include determining that a time at which the third image 102(2) associated with the set of depth points 130 was acquired is closer to a time associated with acquisition of the second set of landmark points 120 than with a time associated with acquisition of the first set of landmark points 120. For example, a difference between the time at which the third image 102(2) was acquired and the time at which the second image 102(1) was acquired may be less than a difference between the time at which the third image 102(2) was acquired and the time at which the first image 102(1) was acquired. Because the robotic device 104 may have moved a smaller distance during the shorter amount of time between acquisition of the third image 102(2) and second image 102(1), the depth points 130 may more strongly correspond to the second set of landmark points 120 than to other sets of landmark points 120. In some implementations, the camera(s) 108 associated with the robotic device 104 may be configured to acquire both a SLAM image 102(1) and a depth image 102(2) concurrently or within a threshold time of one another. In such a case, the landmark points 120 determined using the SLAM image 102(1) and the depth points 130 determined using the depth image 102(2) may be associated with one another based on the acquisition times for each image 102 being within the threshold time of one another. In other implementations, the camera(s) 108 may be configured to acquire SLAM images 102(1) and depth images 102(2) in an alternating manner, such that each depth image 102(2) is acquired at a time between the times at which two SLAM images 102(1) are acquired. An average camera pose for the two SLAM images 102(1) may be determined, such as by interpolating the camera positions and angular orientations for the SLAM images 102(1) to determine average values, and a vector between the camera pose of the depth image 102(2) and the average camera pose may be determined.

Figure 5:
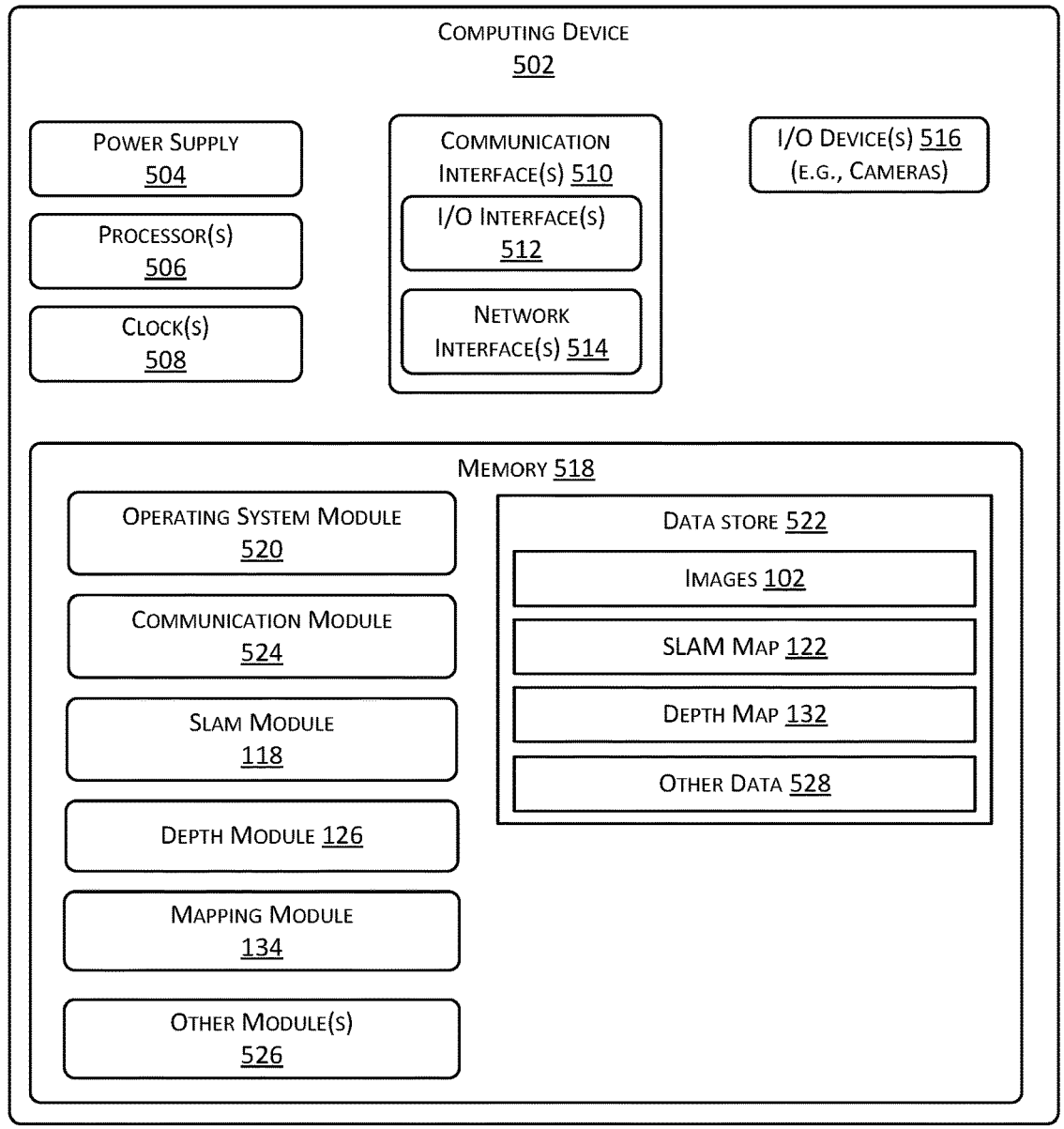
FIG. 5 is a block diagram illustrating a computing device within the scope of the present disclosure.

FIG. 5 is a block diagram 500 illustrating a computing device 502 within the scope of the present disclosure. The computing device 502 may include a robotic device 104, a server, or any other type of computing device 502 in communication with the robotic device 104. While FIG. 5 depicts a single computing device 502, in other implementations, the functions described with regard to the computing device 502 may be performed by any number and any type of computing devices 502. For example, a portion of the functions described herein may be performed by the robotic device 104 while other functions are performed by one or more servers in communications with the robotic device 104. In other cases, all of the functions described herein may be performed by a single computing device 502 or distributed group of computing devices 502.

One or more power supplies 504 may be configured to provide electrical power suitable for operating the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. One or more clocks 508 may provide information indicative of date, time, ticks, and so forth. For example, the processor(s) 506 may use data from the clock 608 to generate a timestamp, trigger a preprogrammed action, and so forth.

The computing device 502 may include one or more communication interface(s) 510, such as input/output (I/O) interface(s) 512, network interface(s) 514, and so forth. The communication interfaces 510 may enable the computing device 502, or components of the computing device 502, to communicate with other computing devices 502 or components thereof. The I/O interface(s) 512 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O device(s) 516. The I/O devices 516 may include any manner of input device or output device associated with the computing device 502 or with another computing device 502 in communication therewith. For example, I/O devices 516 may include touch sensors, keyboards, mouse devices, microphones, image sensors (e.g., cameras 108), scanners, displays, speakers, haptic devices, printers, motion sensors, location sensors, and so forth. In some implementations, the I/O device(s) 516 may be physically incorporated with a computing device 502 or may be externally placed.

The network interface(s) 514 may be configured to provide communications between the computing device 502 and other devices, such as the I/O devices 516, routers, access points, and so forth. The network interface(s) 514 may include devices configured to couple to one or more networks, including local area networks (LANs), wireless LANs, wide area networks (WANs), wireless WANs, and so forth. For example, the network interfaces 514 may include computing devices 502 compatible with Ethernet, Wi-Fi, Wi-Fi Direct, Bluetooth, Bluetooth Low Energy, ZigBee, Z-Wave, 3G, 4G, LTE, and so forth.

The computing device 502 may include one or more busses or other internal communications hardware or software that allows for the transfer of data between the various modules and portions of the computing device 502.

As shown in FIG. 5, the computing device 502 may include one or more memories 518. The memory 518 may include one or more computer-readable storage media (CRSM). The CRSM may be any one or more of an electronic storage medium, a magnetic storage medium, an optical storage medium, a quantum storage medium, a mechanical computer storage medium, and so forth. The memory 518 may provide storage of computer-readable instructions, data structures, program modules, and other data for the operation of the computing device 502. A few example modules are shown stored in the memory 518, although the same functionality may alternatively be implemented in hardware, firmware, or as a system on a chip (SoC).

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processor(s) 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 522 and one or more of the following modules may also be stored in the memory 518. The modules may be executed as foreground applications, background tasks, daemons, and so forth. The data store 522 may use a flat file, database, linked list, tree, executable code, script, or other data structure to store information. In some implementations, the data store 522 or a portion of the data store 522 may be distributed across one or more other devices including other computing devices 502, network attached storage devices, and so forth.

A communication module 524 stored in the memory 518 may be configured to establish communications with other computing devices 502.

The memory 518 may also store the SLAM module 118. The SLAM module 118 may access one or more image analysis algorithms that are useable to determine landmark points 120 based on images 102, generate SLAM maps 122 based on landmark points 120, determine landmark data 124 based on images 102, and determine locations of robotic devices 104 and routes within an environment 106 based on SLAM maps 122 or other types of maps. For example, a SLAM module 118 may use one or more images 102 as inputs to a SLAM algorithm to determine landmark points 120 based on the images 102. The landmark points 120 may correspond to the locations of visible features within the images 102, which may correspond to objects within the environment 106. The SLAM module 118 may also determine landmark data 124 associated with each landmark point 120. If a subsequent image 102 is acquired, the SLAM module 118 may determine correspondence between the SLAM map 122 and visible features of the subsequent image 102, such as by determining landmark points 120 based on the image 102 and the landmark points 120 associated with previously-acquired images 102, to determine a location of the robotic device 104 that acquired the subsequent image 102.

The memory 518 may additionally store the depth module 126. The depth module 126 may determine one or more depth points 130 based on images 102 acquired using a depth camera 108. For example, the depth module 126 may determine a time associated with reflected signals and a distance between the camera 108 and one or more objects based on receipt of the signal(s). Based on the camera pose of the camera 108 and the determined distances, the depth module 126 may determine locations associated with depth points 130 that correspond to the objects and generate a depth map 132 indicative of the locations. In other implementations, the depth module 126 may determine depth points 130 based on the same images 102(1) used by the SLAM module 118.

The memory 518 may also store the mapping module 134. The mapping module 134 may generate a combined map 136 based on the landmark points 120 determined by the SLAM module 118 and the depth points 130 determined by the depth module 126. In addition to generating the combined map 136, the mapping module 134 may determine a set of landmark points 120 (e.g., a SLAM keyframe 202) that corresponds to each set of depth points 130 (e.g., a depth keyframe 212). For example, FIG. 4 depicts multiple methods by which correspondence between a set of depth points 130 and a set of landmark points 120 may be determined. The mapping module 134 may then determine a relationship between the depth points 130 and the corresponding set of landmark points 120, such as by determining a vector between the camera pose associated with the depth points 130 and the camera pose associated with the landmark points 120. Subsequently, if the corresponding set of landmark points 120 is moved, such as due to a correction of an error associated with a SLAM algorithm, the mapping module 134 may move the depth points 130 to a location relative to the landmark points 120 based on the determined relationship. For example, the depth points 130 may be moved to a location such that the vector between the camera pose for the depth points 130 and the camera pose for the landmark points 120 remains constant.

In some implementations, the combined map 136 may be output for use or review by one or more users. For example, the mapping module 134 may be configured to receive user input indicating the presence or absence of landmarks in an environment 106 at particular locations, and one or more points may be added to or removed from the combined map 136 in response to the user input. As the robotic device 104 acquires images 102 representing the areas of the environment 106 associated with the user input, data determined from the images 102 may be used to verify the accuracy of the user input.

Other modules 526 may also be present in the memory 518. For example, other modules 526 may include user interface modules for receiving user input, such as commands to locate a robotic device 104 or navigate the robotic device 104 to a selected location, commands to activate or deactivate a robotic device 104, modify threshold values for selecting keyframes from among images 102, modify threshold values for mapping depth points 130 to landmark points 120, modify the locations of landmark points 120 or depth points 130 within the combined map 136, and so forth. Other modules 526 may also include encryption modules to encrypt and decrypt communications between computing devices 502. Other modules 526 may also include configuration modules to receive and modify user settings, configurations, and preferences, default settings, and so forth.

Other data 528 within the data store 522 may include default configurations and settings associated with computing devices 502, security data, such as encryption keys and schema, access credentials, and so forth.

In different implementations, different computing devices 502 may have different capabilities or capacities. For example, servers may have significantly more processor 506 capability and memory 518 capacity compared to the processor 506 capability and memory 518 capacity of robotic devices 104.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a robotic device having one or more cameras;
one or more memories storing computer-executable instructions;
one or more hardware processors to execute the computer-executable instructions to:
acquire, at a first time, a first image of a physical environment that includes a first object;
determine, by using the first image as an input to a simultaneous localization and mapping (SLAM) algorithm, a first set of landmark points, wherein each landmark point of the first set specifies a first coordinate location that corresponds to a first physical location of the first object in the physical environment;

determine a first camera pose that is indicative of a first camera location and a first angular orientation of the one or more cameras relative to the robotic device, at the first time at which the first image was acquired;

move the one or more cameras from the first camera location to a second camera location;

acquire, at a second time, a second image of the physical environment that includes a second object using the one or more cameras;

determine, by using the second image as an input to the SLAM algorithm, a second set of landmark points, wherein each landmark point of the second set specifies a second coordinate location that corresponds to a second physical location of the second object in the physical environment;

determine a second camera pose that is indicative of the second camera location and a second angular orientation of the one or more cameras relative to the robotic device, at the second time at which the second image was acquired;

acquire, at a third time, a third image from the one or more cameras;

determine, based on the third image, depth data indicative of a distance between the robotic device and a third object;

determine a set of depth points based on the third image, wherein each depth point of the set of depth points specifies a third coordinate location that corresponds to a third physical location of the third object in the physical environment;

determine a third camera pose indicative of a third camera location and a third angular orientation of the one or more cameras relative to the robotic device, at the third time at which the third image was acquired;

generate a map that includes the first set of landmark points, the second set of landmark points, and the set of depth points;

determine that a first difference between the first time and the third time is greater than a second difference between the second time and the third time;

determine a positional difference between the third camera location of the third camera pose and the second camera location of the second camera pose;

determine an angular difference between the third angular orientation of the third camera pose and the second angular orientation of the second camera pose;

determine a first vector between the second camera pose and the third camera pose based on the positional difference and the angular difference;

based on the SLAM algorithm change a first position of the second set of landmark points, relative to the first set of landmark points, to a second position relative to the first set of landmark points; and change a third position of the set of depth points relative to the second set of landmark points, to a fourth position relative to the second set of landmark points, wherein the first vector between the first position and the third position is equal to a second vector between the second position and the fourth position.

2. The system of claim 1, further comprising computer-executable instructions to:

determine that a first difference between the third camera pose and the second camera pose is less than a second difference between the third camera pose and the first camera pose; and wherein the positional difference and the angular difference between the third camera pose and the second camera pose are further determined in response to the first difference between the third camera pose and the second camera pose being less than the second difference between the third camera pose and the first camera pose.

3. The system of claim 1, further comprising computer-executable instructions to:

determine a first distance between a first point associated with the first set of landmark points and a second point associated with the set of depth points;

determine a second distance between the second point and a third point associated with the second set of landmark points; and determine that the second distance is less than the first distance;

wherein the positional difference and the angular difference between the third camera pose and the second camera pose are further determined in response to the second distance being less than the first distance.

4. The system of claim 1, further comprising computer-executable instructions to:

acquire the third image concurrently with acquisition of the second image;

wherein the positional difference and the angular difference between the third camera pose and the second camera pose are further determined in response to the third image being acquired concurrently with the second image.

5. A method comprising:

acquiring a first image of at least a first portion of an environment, the first image having first image characteristics including one or more of a first camera pose or a first time at which the first image was acquired;

determining, based on the first image, a first set of landmark points that correspond to one or more first landmarks in the environment, wherein the first set of landmark points includes a first count of points;

acquiring a second image of at least a second portion of the environment, the second image having second image characteristics including one or more of a second camera pose or a second time at which the second image was acquired;

determining, based on the second image, a second set of landmark points that correspond to one or more second landmarks in the environment, wherein the second set of landmark points includes a second count of points;

acquiring a third image of at least a third portion of the environment, the third image having third image characteristics including one or more of a third camera pose or a third time at which the third image was acquired;

determining, based on the third image, a set of depth points, wherein the set of depth points includes a third count of points, and the third count of points is greater than the first count of points and is greater than the second count of points, and wherein at least a subset of the set of depth points correspond to an object other than the one or more first landmarks or the one or more second landmarks;

determining a first difference between the third image characteristics and the second image characteristics is less than a second difference between the third image characteristics and the first image characteristics;
in response to the first difference being less than the second difference, determining a relationship between the set of depth points and the second set of landmark points;
modifying the second set of landmark points based on the first set of landmark points to form a modified set of landmark points; and
modifying the set of depth points based on the relationship between the set of depth points and the second set of landmark points to form a modified set of depth points, wherein the relationship between the set of depth points and the second set of landmark points corresponds to a relationship between the modified set of depth points and the modified set of landmark points.

6. The method of claim 5, further comprising:
determining the first difference based on a first distance between a first point associated with the set of depth points and a second point associated with the second set of landmark points; and
determining the second difference based on a second distance between the first point and a third point associated with the first set of landmark points.

7. The method of claim 5, wherein the first camera pose is indicative of a first location and a first angular orientation, the second camera pose is indicative of a second location and a second angular orientation, and the third camera pose is indicative of a third location and a third angular orientation, and the method further comprising:
determining the first difference based on a first difference in position between the second location and the third location and a first difference in angle between the second angular orientation and the third angular orientation; and
determining the second difference based on a second difference in position between the first location and the third location and a second difference in angle between the second angular orientation and the third angular orientation.

8. The method of claim 5 further comprising:
determining the first difference between the second time and the third time; and
determining the second difference between the first time and the third time.

9. The method of claim 5, further comprising:
causing the third image to be acquired within a threshold time of the second time at which the second image is acquired; and
determining the first difference and the second difference in response to the causing of the third image to be acquired within the threshold time of the second time.

10. The method of claim 5, further comprising:
determining the relationship based on the first camera pose and the second camera pose, wherein the relationship includes a vector between the second camera pose and the third camera pose.

11. The method of claim 5, further comprising:
generating a map that includes the first set of landmark points, the second set of landmark points, and the set of depth points;
receiving a fourth image;
determining a third set of landmark points based on the fourth image;
determining correspondence between at least a subset of the third set of landmark points and one or more of the first set of landmark points or the second set of landmark points; and
based on the correspondence, determining a first location within the environment at which the fourth image was acquired.

12. The method of claim 11, further comprising:
receiving a command to navigate a device associated with the fourth image from the first location to a second location;
determining, based on the set of depth points, the first set of landmark points, and the second set of landmark points, one or more locations corresponding to one or more objects in the environment; and
determining a route from the first location to the second location, wherein the route avoids intersection with the one or more locations corresponding to the one or more objects.

13. A system comprising:
one or more memories associated storing computer-executable instructions;
one or more hardware processors to execute the computer-executable instructions to:
acquire a first image of at least a first portion of an environment;
determine, based on the first image, a first set of landmark points that include first coordinates, wherein the first coordinates correspond to one or more first landmarks in the environment;
acquire a second image of at least a second portion of the environment;
determine, based on the second image, a set of depth points that include second coordinates, wherein the set of depth points includes a greater count of points than the first set of landmark points and at least a subset of the second coordinates correspond to an object other than the one or more first landmarks;
determine a first relationship between a first location indicated by the first coordinates and a second location indicated by the second coordinates;
modifying the first coordinates of the first set of landmark points to form third coordinates; and
based on the first relationship and the third coordinates, modify the set of depth points by modifying the second coordinates to form fourth coordinates, wherein a second relationship between the third coordinates and the fourth coordinates corresponds to the first relationship between the first coordinates and the second coordinates.

14. The system of claim 13, further comprising computer-executable instructions to:
determine a first camera pose associated with the first image;
determine a second camera pose associated with the second image;
determine a difference between the first camera pose and the second camera pose; and
determine the first relationship between the first set of landmark points and the set of depth points based at least in part on the difference between the first camera pose and the second camera pose.

15. The system of claim 13, further comprising computer-executable instructions to:
acquire a third image of at least a third portion of the environment;

determine, based on the third image, a second set of landmark points representative of fifth coordinates, wherein the fifth coordinates correspond to one or more second landmarks in the environment; and determine that a first distance between a first point associated with the set of depth points and a second point associated with the first set of landmark points is less than a second distance between the first point and a third point associated with the second set of landmark points;

wherein the first relationship is determined in response to the first distance being less than the second distance.

16. The system of claim 13, further comprising computer-executable instructions to:

acquire a third image of at least a third portion of the environment;

determine, based on the third image, a second set of landmark points representative of fifth coordinates, wherein the fifth coordinates correspond to one or more second landmarks in the environment;

determine a first camera pose associated with the first image;

determine a second camera pose associated with the second image;

determine a third camera pose associated with the third image; and determine that a first difference between the first camera pose and the second camera pose is less than a second difference between the first camera pose and the third camera pose;

wherein the first relationship is determined in response to the first difference being less than the second difference.

17. The system of claim 13, further comprising computer-executable instructions to:

acquire a third image of at least a third portion of the environment;

determine, based on the third image, a second set of landmark points representative of fifth coordinates, wherein the fifth coordinates correspond to one or more second landmarks in the environment;

determine a first time at which the first image was acquired;

determine a second time at which the second image was acquired;

determine a third time at which the third image was acquired; and determine that a first difference between the first time and the second time is less than a second difference between the first time and the third time;

wherein the first relationship is determined in response to the first difference being less than the second difference.

18. The system of claim 13, further comprising computer-executable instructions to:

acquire the first image at a first time that is within a threshold time of a second time at which the second image is acquired;

wherein the first relationship is determined in response to the first time being within the threshold time of the second time.

19. The system of claim 13, further comprising computer-executable instructions to:

generate a map that includes the first set of landmark points and the depth points;

receive a third image from a robotic device;

determine a second set of landmark points based on the third image;

determine, based on correspondence between the second set of landmark points and the first set of landmark points, a third location of the robotic device within the environment;

determine, based on the map, one or more locations of one or more objects in the environment; and determine a route between the third location and a fourth location within the environment, wherein the route avoids intersection with the one or more locations.

20. The system of claim 13, further comprising computer-executable instructions to:

acquire a third image of at least a third portion of the environment;

determine, based on the third image, a second set of landmark points representative of fifth coordinates, wherein the fifth coordinates correspond to one or more second landmarks in the environment;

determine a first camera pose associated with the first image;

determine a second camera pose associated with the second image;

determine a third camera pose associated with the third image;

determine an average camera pose based on the first camera pose and the third camera pose; and determine a vector between the second camera pose and the average camera pose;

wherein the first relationship is determined based on the vector.

* * * * *

UNITED STATES PATENT AND TRADEMARK OFFICE
CERTIFICATE OF CORRECTION

PATENT NO. : 11,321,914 B1
APPLICATION NO. : 15/867449
DATED : May 3, 2022
INVENTOR(S) : David Allen Fotland et al.

It is certified that error appears in the above-identified patent and that said Letters Patent is hereby corrected as shown below:

In the Claims

Column 18, Claim 1, Line 59:
Currently reads "instructions;"
When it should read --instructions; and--.

Column 18, Claim 1, Line 63:
Currently reads "environment that includes a first object;"
When it should read --environment;--.

Column 18, Claim 1, Lines 64-67 to Column 19, Lines 1-3:
Currently read "determine, by using the first image as an input to a simultaneous localization and mapping (SLAM) algorithm, a first set of landmark points, wherein each landmark point of the first set specifies a first coordinate location that corresponds to a first physical location of the first object in the physical environment;"
When they should read --determine, using the first image, a first set of landmark points;--.

Column 19, Claim 1, Line 7:
Currently reads "the first time at which the first image was acquired;"
When it should read --the first time;--.

Column 19, Claim 1, Lines 11-12:
Currently read "physical environment that includes a second object using the one or more cameras;"
When they should read --physical environment using the one or more cameras;--.

Column 19, Claim 1, Lines 13-18:
Currently read "determine, by using the second image as an input to the SLAM algorithm, a second set of landmark points, wherein each landmark point of the second set specifies a second coordinate location that corresponds to a second physical location of the second object in the physical environment;"

Signed and Sealed this
Nineteenth Day of July, 2022

Katherine Kelly Vidal
*Director of the United States Patent and Trademark Office*

CERTIFICATE OF CORRECTION (continued)
U.S. Pat. No. 11,321,914 B1

When they should read --determine, using the second image, a second set of landmark points;--.

Column 19, Claim 1, Lines 22-23:
Currently read "robotic device, at the second time at which the second image was acquired;"
When they should read --robotic device, at the second time;--.

Column 19, Claim 1, Lines 26-28:
Currently read "determine, based on the third image, depth data indicative of a distance between the robotic device and a third object;"
When they should read --determine a set of depth points based on the third image;--.

Column 19, Claim 1, Lines 29-33:
Should be deleted.

Column 19, Claim 1, Line 37:
Currently reads "the third time at which the third image was acquired;"
When it should read --the third time;--.

Column 19, Claim 1, Lines 38-40:
Currently read "generate a map that includes the first set of landmark points, the second set of landmark points, and the set of depth points;"
When they should read --determine that the set of depth points correspond more to the second set of landmark points than the first set of landmark points;--.

Column 19, Claim 1, Lines 41-50:
Should be deleted.

Column 19, Claim 1, Lines 52-53:
Currently read "pose and the third camera pose based on the positional difference and the angular difference;"
When they should read --pose and the third camera pose;--.

Column 19, Claim 1, Lines 54-57:
Currently read "based on the SLAM algorithm change a first position of the second set of landmark points, relative to the first set of landmark points, to a second position relative to the first set of landmark points; and"
When they should read --change a first position of the second set of landmark points to a second position relative to the first set of landmark points; and--.

Column 19, Claim 1, Lines 58-64:
Currently read "change a third position of the set of depth points relative to the second set of landmark points, to a fourth position relative to the second set of landmark points, wherein the first vector between the first position and the third position is equal to a second vector between the second position and the fourth position."
When they should read --move the set of depth points to a different position using the first vector.--.

CERTIFICATE OF CORRECTION (continued)
U.S. Pat. No. 11,321,914 B1

Column 19, Claim 2, Lines 65-66:
Currently read "The system of claim 1, further comprising computer-executable instructions to:"
When they should read --The system of claim 1, the one or more hardware processors to further execute the computer-executable instructions to:--.

Column 20, Claim 2, Lines 5-7:
Currently read "wherein the positional difference and the angular difference between the third camera pose and the second camera pose are further determined in response to the"
When they should read --determine a positional difference and an angular difference between the third camera pose and the second camera pose in response to the--.

Column 20, Claim 3, Lines 12-13:
Currently read "The system of claim 1, further comprising computer-executable instructions to:"
When they should read --The system of claim 1, the one or more hardware processors to further execute the computer-executable instructions to:--.

Column 20, Claim 3, Line 21:
Currently reads "distance;"
When it should read --distance; and--.

Column 20, Claim 3, Lines 22-24:
Currently read "wherein the positional difference and the angular difference between the third camera pose and the second camera pose are further determined in response to the"
When they should read --determine a positional difference and an angular difference between the third camera pose and the second camera pose in response to the--.

Column 20, Claim 4, Lines 26-27:
Currently read "The system of claim 1, further comprising computer-executable instructions to:"
When they should read --The system of claim 1, the one or more hardware processors to further execute the computer-executable instructions to:--.

Column 20, Claim 4, Line 29:
Currently reads "the second image;"
When it should read --the second image; and--.

Column 20, Claim 4, Lines 30-32:
Currently read "wherein the positional difference and the angular difference between the third camera pose and the second camera pose are further determined in response to the"
When they should read --determine a positional difference and an angular difference between the third camera pose and the second camera pose in response to the--.

Column 20, Claim 5, Lines 37-39:
Currently read "environment, the first image having first image characteristics including one or more of a first camera pose or a first time at which the first image was acquired;"
When they should read --environment;--.

CERTIFICATE OF CORRECTION (continued)
U.S. Pat. No. 11,321,914 B1

Column 20, Claim 5, Lines 41-43:
Currently read "landmark points that correspond to one or more first landmarks in the environment, wherein the first set of landmark points includes a first count of points;"
When they should read --landmark points;--.

Column 20, Claim 5, Lines 45-48:
Currently read "the environment, the second image having second image characteristics including one or more of a second camera pose or a second time at which the second image was acquired;"
When they should read --the environment;--.

Column 20, Claim 5, Lines 50-52:
Currently read "landmark points that correspond to one or more second landmarks in the environment, wherein the second set of landmark points includes a second count of points;"
When they should read --landmark points;--.

Column 20, Claim 5, Lines 54-56:
Currently read "environment, the third image having third image characteristics including one or more of a third camera pose or a third time at which the third image was acquired;"
When they should read --environment;--.

Column 20, Claim 5, Lines 58-64:
Currently read "points, wherein the set of depth points includes a third count of points, and the third count of points is greater than the first count of points and is greater than the second count of points, and wherein at least a subset of the set of depth points correspond to an object other than the one or more first landmarks or the one or more second landmarks;"
When they should read --points;--.

Column 20, Claim 5, Line 66:
Currently reads "characteristics and the second image characteristics is"
When it should read --and the second image is--.

Column 21, Claim 5, Line 2:
Currently reads "characteristics and the first image characteristics;"
When it should read --and the first image; and--.

Column 21, Claim 5, Line 6:
Currently reads "points;"
When it should read --points.--.

Column 21, Claim 5, Lines 7-16:
Should be deleted.

Column 21, Claim 7, Lines 25-30:
Currently read "The method of claim 5, wherein the first camera pose is indicative of a first location and a first angular orientation, the second camera pose is indicative of a second location and a second angular orientation, and the third camera pose is indicative of a third location and a third angular orientation, and the method further comprising:"
When they should read --The method of claim 5, wherein the first image has first image characteristics including a first camera pose that is indicative of a first location and a first angular orientation, the second image has second image characteristics including a second camera pose that is indicative of a second location and a second angular orientation, and the third image has third image characteristics including a third camera pose that is indicative of a third location and a third angular orientation, and the method further comprising:--.

Column 21, Claim 7, Line 39:
Currently reads "the second angular orientation and the third angular"
When it should read --the first angular orientation and the third angular--.

Column 21, Claim 8, Lines 41-45:
Currently read "The method of claim 5 further comprising: determining the first difference between the second time and the third time; and determining the second difference between the first time and the third time."
When they should read --The method of claim 5, further comprising: determining a first time at which the first image was acquired; determining a second time at which the second image was acquired; determining a third time at which the third image was acquired; determining the first difference as a difference between the second time and the third time; and determining the second difference as a difference between the first time and the third time.--.

Column 21, Claim 9, Line 48:
Currently reads "time of the second time at which the second image is"
When it should read --time of a first time at which the second image is--.

Column 21, Claim 9, Lines 51-52:
Currently read "in response to the causing of the third image to be acquired within the threshold time of the second time."
When it should read --in response to the causing the third image to be acquired within the threshold time of the first time.--.

Column 21, Claim 10, Lines 54-57:
Currently read "determining the relationship based on the first camera pose and the second camera pose, wherein the relationship includes a vector between the second camera pose and the third camera pose."
When they should read --determining the relationship based on a first camera pose associated with the first image and a second camera pose associated with the second image, wherein the relationship includes a vector between the second camera pose and a third camera pose associated with the third image.--.

Column 22, Claim 13, Lines 21-22:
Currently read "one or more memories associated storing computer-executable instructions;"
When they should read --one or more memories storing computer-executable instructions; and--.

Column 22, Claim 13, Lines 28-29:
Currently read "landmark points that include first coordinates, wherein the first coordinates correspond to one or"
When they should read --landmark points corresponding to one or--.

Column 22, Claim 13, Lines 34-38:
Currently read "points that include second coordinates, wherein the set of depth points includes a greater count of points than the first set of landmark points and at least a subset of the second coordinates correspond to an object other than the one or more first landmarks;"
When they should read --points, wherein at least a portion of the set of depth points correspond to an object other than the one or more first landmarks in the environment; and--.

Column 22, Claim 13, Lines 39-50:
Currently read "determine a first relationship between a first location indicated by the first coordinates and a second location indicated by the second coordinates; modifying the first coordinates of the first set of landmark points to form third coordinates; and based on the first relationship and the third coordinates, modify the set of depth points by modifying the second coordinates to form fourth coordinates, wherein a second relationship between the third coordinates and the fourth coordinates corresponds to the first relationship between the first coordinates and the second coordinates."
When they should read --generate a map that includes the first set of landmark points and the set of depth points.--.

Column 22, Claim 14, Lines 51-52:
Currently read "The system of claim 13, further comprising computer-executable instructions to:"
When they should read --The system of claim 13, the one or more hardware processors to further execute the computer-executable instructions to:--.

Column 22, Claim 15, Lines 63-64:
Currently read "The system of claim 13, further comprising computer-executable instructions to:"
When they should read --The system of claim 13, the one or more hardware processors to further execute the computer-executable instructions to:--.

Column 23, Claim 15, Lines 2-4:
Currently read "landmark points representative of fifth coordinates, wherein the fifth coordinates correspond to one or more second landmarks in the environment; and"
When they should read --landmark points;--.

Column 23, Claim 15, Line 10:
Currently reads "points;"
When it should read --points; and--.

Column 23, Claim 15, Lines 11-12:
Currently read "wherein the first relationship is determined in response to the first distance being less than the second distance."
When they should read --determine a first relationship between a first location associated with the first image and a second location associated with the second image, in response to the first distance being less than the second distance.--.

Column 23, Claim 16, Lines 13-14:
Currently read "The system of claim 13, further comprising computer-executable instructions to:"
When they should read --The system of claim 13, the one or more hardware processors to further execute the computer-executable instructions to:--.

Column 23, Claim 16, Lines 18-20:
Currently read "landmark points representative of fifth coordinates, wherein the fifth coordinates correspond to one or more second landmarks in the environment;"
When they should read --landmark points;--.

Column 23, Claim 16, Line 26:
Currently reads "image; and"
When it should read --image;--.

Column 23, Claim 16, Line 29:
Currently reads "difference between the first camera pose and the third"
When it should read --difference between the second camera pose and the third--.

Column 23, Claim 16, Line 30:
Currently reads "camera pose;"
When it should read --camera pose; and--.

Column 23, Claim 16, Lines 31-33:
Currently read "wherein the first relationship is determined in response to the first difference being less than the second difference."
When they should read --determine a first relationship between a first location associated with the first image and a second location associated with the second image, in response to the first difference being less than the second difference.--.

Column 23, Claim 17, Lines 34-35:
Currently read "The system of claim 13, further comprising computer-executable instructions to:"
When they should read --The system of claim 13, the one or more hardware processors to further execute the computer-executable instructions to:--.

Column 23, Claim 17, Lines 39-41:
Currently read "landmark points representative of fifth coordinates, wherein the fifth coordinates correspond to one or more second landmarks in the environment;"
When they should read --landmark points;--.

Column 23, Claim 17, Line 47:
Currently reads "acquired; and"
When it should read --acquired;--.

CERTIFICATE OF CORRECTION (continued)
U.S. Pat. No. 11,321,914 B1

Column 23, Claim 17, Line 50:
Currently reads "the first time and the third time;"
When it should read --the second time and the third time; and--.

Column 24, Claim 17, Line 1:
Currently reads "wherein the first relationship is determined in response to"
When it should read --determine a first relationship between a first location associated with the first image and a second location associated with the second image, in response to--.

Column 24, Claim 18, Lines 4-5:
Currently read "The system of claim 13, further comprising computer-executable instructions to:"
When they should read --The system of claim 13, the one or more hardware processors to further execute the computer-executable instructions to:--.

Column 24, Claim 18, Line 8:
Currently reads "image is acquired;"
When it should read --image is acquired; and--.

Column 24, Claim 18, Line 9:
Currently reads "wherein the first relationship is determined in response to"
When it should read --determine a first relationship between a first location associated with the first image and a second location associated with the second image, in response to--.

Column 24, Claim 19, Lines 12-13:
Currently read "The system of claim 13, further comprising computer-executable instructions to:"
When they should read --The system of claim 13, the one or more hardware processors to further execute the computer-executable instructions to:--.

Column 24, Claim 19, Lines 14-15:
Should be deleted.

Column 24, Claim 19, Line 21:
Currently reads "points, a third location of the robotic device within the"
When it should read --points, a first location of the robotic device within the--.

Column 24, Claim 19, Line 25:
Currently reads "determine a route between the third location and a fourth"
When it should read --determine a route between the first location and a second--.

Column 24, Claim 20, Lines 28-29:
Currently read "The system of claim 13, further comprising computer-executable instructions to:"
When they should read --The system of claim 13, the one or more hardware processors to further execute the computer-executable instructions to:--.

Column 24, Claim 20, Lines 33-35:
Currently read "landmark points representative of fifth coordinates, wherein the fifth coordinates correspond to one or more second landmarks in the environment;"
When they should read --landmark points;--.

Column 24, Claim 20, Line 43:
Currently reads "camera pose and the third camera pose; and"
When it should read --camera pose and the third camera pose;--.

Column 24, Claim 20, Line 45:
Currently reads "the average camera pose;"
When it should read --the average camera pose; and--.

Column 24, Claim 20, Lines 46-47:
Currently read "wherein the first relationship is determined based on the vector."
When they should read --determine a first relationship between a first location associated with the first image and a second location associated with the second image based on the vector.--.